United States Patent Office 3,399,119
Patented Aug. 27, 1968

3,399,119
REACTION AND DISTILLATION PROCESS FOR N-CONTAINING SOLVENTS FROM MIXTURES THEREOF WITH HYDROGEN HALIDES
David W. Hall, Englewood, and Edward Hurley, Jr., Littleton, Colo., assignors to Marathon Oil Company, Findlay, Ohio, a corporation of Ohio
No Drawing. Filed July 8, 1966, Ser. No. 563,695
13 Claims. (Cl. 203—38)

ABSTRACT OF THE DISCLOSURE

The present invention comprises a process for the separation of basic organic nitrogen-containing solvents having a base constant in the range of from about $10^{-11}$ to about $10^{-18}$ and comprising N-lower alkyl-2-pyrrolidone, said basic organic solvents having the property of reacting with hydrogen halides to form salts, from mixtures containing such basic organic solvents in admixture with substantially anhydrous hydrogen halides comprising in combination the steps of adding to said mixtures mono- or polyhydric aliphatic alcohols in a quantity sufficient to provide at least one mole of OH groups for each mole of H+ groups contained in said hydrogen halides, thereafter heating the resulting mixture to cause the alcohol to react with the halide to form the corresponding alkyl halides and thereafter heating said mixture to a temperature sufficiently high to distill off alkyl halides thus formed.

---

The present invention relates to new methods for recovery of organic solvents and, in particular, relates to methods for the recovery of basic organic solvents from mixtures containing such solvents in admixture with hydrogen halides.

In many organic reactions, such as those in which hydrogen halides are split from molecules to give unsaturated compounds by dehydrohalogenation, a basic organic solvent is often employed as the reaction media. In such instances the organic solvent is usually contaminated with the hydrogen halide, in almost all cases in the form of the hydrogen halide salt of the solvent. Most basic organic solvents are relatively expensive and their recovery is essential to the economic commercial use of reactions employing such solvents as reaction media.

Various methods have been taught by the literature for the recovery of such solvents, including treatment with strong inorganic bases such as sodium hydroxide. Recovery of solvents by such methods causes loss of the hydrogen halide through neutralization. The by-product inorganic halide salts often are of no value and constitute a disposal problem.

The present invention provides a method whereby organic basic solvents contaminated with hydrogen halides may be reclaimed in excellent yields. Further advantages of the present invention are: (a) no by-product inorganic salts are formed, thus a disposal problem is eliminated, and (b) the solvent reclaimed is not contaminated with its own hydrolysis decomposition products. An amount of water is formed in the present invention which is equal (on a molar basis) only to the amount of hydrogen halide present initially as an impurity. This small amount of water may be removed by distillation in some cases or, in any case, may be removed by the use of conventional drying agents which may, in turn be regenerated.

The process of the present invention comprises the steps of treating mixtures containing basic organic solvents in admixture with hydrogen halide with mono- or polyhydric alcohols in quantity sufficient to provide at least one mole of OH for each mole of hydrogen halide present in the mixture, and heating to a temperature at least sufficient to cause the alkyl halide thus formed to distill off.

The alkyl halide may then be condensed and recovered, either for sale or use as an alkyl halide, or alternatively, may be hydrolyzed to regenerate the alcohol originally added to the mixture. The alcohol may then be recycled back to treat additional quantities of the mixture of basic organic solvent and hydrogen halide and to form additional quantities of alkyl halides.

After the hydrolysis of the alkyl halide and separation of the resulting alcohol by conventional techniques, e.g. distillation, the remaining mixture of water and hydrogen halide may be either used without further treatment or may be dried conventionally, e.g. by use of azeotropic distillation, preferably with calcium chloride if the hydrogen halide is HCl to yield valuable anhydrous hydrogen chloride.

The original mixture now comprises the basic organic solvent together with water unless water was removed by simultaneous distillation, preferably azeotropic distillation, together with the alkyl chloride. This mixture may also be utilized either directly e.g. as media for additional reactions or may be dried conventionally to recover the anhydrous basic organic solvent.

The term basic organic solvent as used herein means a weakly basic nitrogen containing compound, preferably having a base constant ($K_b$) in the range of from about $10^{-11}$ to about $10^{-18}$, more preferably $10^{-12}$ to $10^{-16}$, such as amides, particularly tertiary amides, exemplified by N-methyl-2-pyrrolidone (NMP), N-ethyl-2-pyrrolidone, dimethylformamide, and the like. These organic basic solvents react with hydrogen halides to form salts. In addition, most such basic organic solvents have vapor pressures which, generally speaking, are higher than that of the alkyl halides formed in the process of the present invention and the organic basic solvents therefore do not interfere with withdrawal, preferably by distillation, of the alkyl halides.

As used herein, the term mono- and polyhydric alcohols includes any of the wide variety of saturated and unsaturated alkyl and arylalkyl alcohols which contain at least one OH group on a carbon which is nonaromatic. Alcohols containing hydroxyl groups located only on aromatic carbon atoms are not, in general, suitable for the processes of the present invention. By "alkyl halides" is meant those chlorides, bromides, iodides and fluorides (in decreasing order of preference) which correspond to the mono- and polyhydric alcohols described above.

Mixtures of hydrogen chlorides and organic basic solvents which are particularly preferred as starting materials for the processes of the present invention include mixtures of hydrogen bromide, hydrogen iodide and, most preferably, hydrogen chloride with basic organic solvents such as those described above and, particularly, with N-alkyl-pyrrolidone, most especially with N-methyl-2-pyrrolidone.

The alcohols used for the process of the present invention will be, in most cases, monohydric for purposes of economy. Especially preferred among the monohydric alcohols will be ethanol and methanol. In a most preferred embodiment of the present invention ethanol may be employed in sufficient quantities as to form an azeotrope with the water which is formed by the reaction of the ethanol with the hydrogen halide to form ethyl halides. This azeotropic mixture of alcohol and water may then be readily removed from solutions containing the alkyl halides, after which the alcohol and water can be conventionally separated if desired.

Among the polyhydric alcohols ethylene glycol will be particularly preferred. Cyclic alcohols such as cyclohexanol may be employed under special circumstances as can arylalkyl, e.g., benzyl alcohols.

The amounts of alcohol added to the mixtures should, in virtually all cases, be at least stoichiometrically sufficient to cause all of the hydrogen halide to react. Above this level the amount of alcohol added is not narrowly critical and may be readily optimized for the particular reaction conditions and reactants involved. However, in most cases the alcohol added will be from about 1.0 to about 10 times the stoichiometric quantity with amounts of from about 1.0 to about 2 times the stoichiometric quantity being especially preferred.

Similarly the temperatures employed with the reactions of the present invention are not narrowly critical, but will generally be above about 20° C., below which temperature the reaction between most alcohols and most hydrogen halide salts will not proceed at a practical rate. The temperatures will generally be sufficiently high to cause the alkyl halide to distill under the pressures existing in the reaction vessel, and sufficiently low to prevent decomposition of the products of the invention. Broadly speaking, the preferred temperatures will be from about 20° C. to about 400° C., with temperatures in the range of from about 50° C. to about 200° C. being most preferred.

The pressures utilized for the conducting of the reactions of the present invention will in most cases, be atmospheric, but may under special circumstances be adjusted in order to permit the use of particularly desirable temperatures. In most instances, pressures will range from about 0.1 to about 100 atmospheres with pressures of from about 0.5 to about 10.0 atmospheres being especially preferred.

The reactions of the present invention can be practiced on a continuous, or batch basis. Apparatus for the present invention will be entirely conventional and in most cases will consist of stirred reaction vessels with distillation heads. Materials of construction may in some cases, for example, where HF is the hydrogen halide, be especially selected to accommodate the known properties of the reagents employed.

The process of the present invention will be more fully understood by reference to the following examples. However, it should be understood that the invention is susceptible to a wide variety of variations and modifications which will be obvious to those skilled in the art from a reading of the description provided herein. All such obvious modifications and variations are to be taken as being included within the scope of the claims appended hereto.

EXAMPLE I

Reaction of methanol with NMP—HCl according to the present invention.—Methanol (13.8 g.; 0.432 mole) is added to N-methyl-2-pyrrolidone (NMP) containing between 9 and 10% based on the weight of the NMP of anhydrous HCl (169.3 g. total weight of NMP plus HCl) in an ordinary glass laboratory flask fitted with an upright 1-inch by 18-inch Vigreaux column with a takeoff connected to a Dry Ice condenser. The mixture is heated 16 hours at 85–95° C. After this time the methyl chloride in the Dry Ice trap corresponds to a 46% yield. (All yields reported herein are based on theoretical.) The conversion of methanol is approximately 46%. Methyl chloride is identified by its infrared spectrum (comparison with Sadtler spectrum) and by its gas-liquid chromatography (GLC) retention time which is the same as an authentic sample of methyl chloride used to spike the product sample. Only a small amount of methanol is found in the Dry Ice trap. The NMP solution remains relatively clear, indicating that decomposition is negligible. GLC indicates no low boilers in the product other than methyl chloride and small amounts of methanol.

EXAMPLE II

Reaction of tert butanol according to the present invention.—Tert butanol (28.1 g.; 0.38 mole) is added to 160.6 g. of the NMP/HCl solution described in Example I. The apparatus is the same as that employed in Example I. After a 16-hour reaction at 85–95° C., the conversion of the tert-butanol is approximately 83%. The product contains about 77 weight percent isobutylene and about 23% tert-butyl chloride. The production of tert butyl chloride can readily be promoted by removing this product more rapidly from the reaction mixture in order to minimize its eliminative decomposition. Analysis of products is in each case accomplished by GLC analysis with the product sample spiked with authentic samples.

EXAMPLE III

Reaction of methanol with HCl salt of NMP according to the present invention.—NMP and anhydrous HCl are combined to give a mixture (heterogeneous at room temperature) containing 7.8 weight percent HCl. The mixture (227.2 g. total weight) is placed in apparatus similar to that employed in Example I with stirrer, gas exit tube leading to a Dry Ice trap and chilled water reflux condenser for returning methanol to the reaction pot. The mixture is agitated to obtain as even as possible a dispersion of the precipitated NMP·HCl. Methanol is added to the reaction pot via dropping funnel at a reaction temperature of 115–125° C. Crude methyl chloride (97.5% $CH_3Cl$ with 2.5% methanol) totaling 17.3 g. is collected over a reaction period of three hours. A further three hours reaction yields an additional 1.2 g. of methyl chloride of similar purity. HCl recovery as methyl chloride is estimated at at least 92%.

EXAMPLE IV

Reaction of aniline hydrochloride in NMP.—Methanol is added to a mixture of aniline hydrochloride (30.0 g.) in NMP (176.7 g.) according to the procedures of Example III. After 20 hours reaction period at about 115° C. methyl chloride is formed in fair yield (28% of theory).

EXAMPLE V

Reaction of methanol with aniline hydrochloride in the presence of aniline as the reaction medium.—A run similar to that of Example IV is made using aniline/aniline hydrochloride mixture (in similar molar ratio) in place of the aniline hydrochloride/NMP mixture. After 20 hours reaction period at 100° C. no appreciable methyl chloride is produced.

EXAMPLE VI

Reaction of propylene glycol according to the present invention.—The apparatus of Example I is modified for this reaction in that the side-arm take off from the distillation head is attached to a chilled water condenser which is in turn connected to an ordinary receiver for collection of normally liquid products. A gas exit tube leads from this receiver to a Dry Ice trap used to collect gaseous products as previously described.

A gentle nitrogen flush is used so that products are purged from the reaction flask as formed and collected in the receiver and trap. This is done to prevent decomposition of sensitive products in the reaction flask during heating.

One hundred grams of NMP containing about 4.5 weight percent of HCl is mixed with 25 g. of propylene glycol and heated at 160° C. for 20 hours. About 5 g. of products are present in each collection vessel at this point. GLC analysis of the products found in the Dry Ice trap shows 1- and 2-chloropropenes, allyl chloride, propionaldehyde, acetone and allyl alcohol present in minor amounts, with the major component being 1,2-dichloropropane. Similarly, products in the receiver are found to include minor amounts of propionaldehyde, acetone, allyl alcohol, water, 1-chloro-2-propanol, and 2-chloro-1-propanol. 1,2-dichloropropane is the major component found in the receiver.

EXAMPLE VII

Utilization of chloride salts ($CaCl_2$) to prepare methyl chloride from methanol.—49.0 g. (0.50 mole) concentrated $H_2SO_4$ and 55.5 g. (0.50 mole) anhydrous $CaCl_2$ are added to 496.4 g. NMP in a 1000 ml., 3-necked, Morton flask equipped with a mechanical paddle blade stirrer (having a chilled water bearing sleeve), thermometer, and a short chilled water reflux condenser. In an upright position above the reflux condenser is first an adapter with a gas exit port and then an addition funnel (pressure equalizing). In the gas collecting system are two Dry Ice-acetone traps in series followed by a Drierite tower (2" diameter x 12" height). 32.0 g. (1.00 mole) of methanol is added to the addition funnel. There is an exotherm when adding the concentrated $H_2SO_4$ to the NMP. The resulting NMP, $H_2SO_4$ and $CaCl_2$ mixture is then heated to 100° C. and the methanol added dropwise. Methanol addition is complete in 2½ hours. Total reaction time is 6 hours. 11.0 g. condensate is collected in the cold trap which consists of 95.3% $CH_3Cl$ or a yield of 20.8% $CH_3Cl$.

This example illustrates that the hydrogen halide may be formed in situ, for example, by reacting a metal halide with a strong acid as above.

What is claimed is:

1. A process for the separation of basic organic nitrogen-containing solvents and comprising a weakly basic nitrogen-containing compound having a base constant in the range of from about $10^{-11}$ to about $10^{-18}$, said basic organic solvents having the property of reacting with hydrogen halides to form hydrogen halide salts of the organic solvents, said salts having lower vapor pressures than said basic organic solvents, from mixtures containing such basic organic solvents in admixture with substantially anhydrous hydrogen halides comprising in combination the steps of adding to said mixtures mono- or polyhydric aliphatic alcohols in a quantity sufficient to provide at least one mole of OH groups for each mole of H+ groups contained in said hydrogen halides, thereafter heating the resulting mixture to cause the alcohol to react with the halide to form the corresponding alkyl halides and thereafter heating said mixture to a temperature sufficiently high to distill off alkyl halides thus formed, the distilling temperature being kept sufficiently low to prevent decomposition of the reaction products.

2. The process of claim 1 wherein the alkyl halide is recovered after distillation, and thereafter hydrolized to regenerate alcohol which is then recovered.

3. The process of claim 2 wherein the alcohol after recovery is recycled to treat additional quantities of said mixtures.

4. The process of claim 1 wherein the basic organic solvent is recovered from said mixture after removal of said alkyl halide by drying the remaining components of said mixture.

5. The process of claim 1 wherein a substantial portion of the water formed by the interreaction between the alcohol and the iorganic acidic compound is removed by distillation together with the alkyl halide.

6. The process of claim 5 wherein the alcohol comprises a substantial portion of ethyl alcohol which is added in sufficient excess to cause removal of a major portion of the water from said mixture by azeotropic distillation together with the alkyl halide.

7. The process of claim 1 wherein the hydrogen halide comprises a major portion of HCl.

8. The process of claim 1 wherein the hydrogen halide comprises a major portion of HBr.

9. The process of claim 1 wherein the hydrogen halide comprises a major portion of HI.

10. The process of claim 1 wherein the hydrogen halide comprises a major portion of HF, and wherein at least one mole of an alkyl halide, selected from the group consisting of alkyl chloride, alkyl bromides, and alkyl iodides, is added for each mole of HF present in said mixture.

11. The process of claim 1 wherein the hydrogen halide comprises a major portion of HF and wherein at least one mole of another hydrogen halide is added for each mole of HF present in said mixture.

12. The process of claim 1 wherein the hydrogen halide is first produced in situ by the reaction of a metal halide with a strong acid.

13. A process according to claim 1 wherein the weakly basic nitrogen-containing compound is an N-lower alkyl-2-pyrrolidone.

References Cited

UNITED STATES PATENTS

| 1,852,063 | 4/1932 | Ricard | 260—657 |
| 2,122,110 | 6/1938 | Olin et al. | 260—657 |
| 2,153,170 | 4/1939 | Buc et al. | 260—657 |
| 2,210,564 | 8/1940 | Mannheim et al. | 260—657 X |
| 2,360,655 | 10/1944 | Deanesly | 203—64 X |
| 2,413,205 | 12/1946 | Word et al. | 203—38 X |
| 2,847,484 | 8/1958 | Kolker | 260—657 |
| 2,977,290 | 3/1961 | Molander | 260—657 X |
| 3,278,397 | 10/1966 | Price | 203—38 X |
| 2,837,524 | 6/1958 | Oberrauch | 260—326.8 |
| 3,192,210 | 6/1965 | Lunsford et al. | 260—326.8 |

FOREIGN PATENTS 472,465   3/1951   Canada.

NORMAN YUDKOFF, *Primary Examiner.*

F. E. DRUMMOND, *Assistant Examiner.*